US006664312B2

(12) United States Patent
Devonport

(10) Patent No.: US 6,664,312 B2
(45) Date of Patent: Dec. 16, 2003

(54) PARTICLE HAVING AN ATTACHED HALIDE GROUP AND METHODS OF MAKING THE SAME

(75) Inventor: Wayne Devonport, Tewksbury, MA (US)

(73) Assignee: Cabot Corporation, Boston, MA (US)

( * ) Notice: Subject to any disclaimer, the term of this patent is extended or adjusted under 35 U.S.C. 154(b) by 137 days.

(21) Appl. No.: 10/040,840

(22) Filed: Jan. 7, 2002

(65) Prior Publication Data
US 2002/0055554 A1 May 9, 2002

Related U.S. Application Data

(60) Division of application No. 09/324,315, filed on Jun. 2, 1999, now Pat. No. 6,350,519, which is a continuation-in-part of application No. 09/089,263, filed on Jun. 3, 1998, now Pat. No. 6,103,380.

(51) Int. Cl.$^7$ .............. C08K 9/04; C08K 9/08; C08K 9/10
(52) U.S. Cl. .............. 523/205; 523/160; 523/161; 523/209; 523/275; 523/216
(58) Field of Search .............. 523/205, 215, 523/216, 209, 160, 161

(56) References Cited

U.S. PATENT DOCUMENTS

| 2,121,535 A | 6/1938 | Amon ............ 106/473 |
| 2,439,442 A | 4/1948 | Amon et al. ............ 23/209.1 |
| 2,793,100 A | 5/1957 | Weihe ............ 423/460 |
| 2,867,540 A | 1/1959 | Harris ............ 106/476 |
| 3,011,902 A | 12/1961 | Jordon ............ 106/30 R |
| 3,025,259 A | 3/1962 | Watson et al. ............ 106/476 |
| 3,317,458 A | 5/1967 | Clas et al. ............ 260/41.5 |
| 3,335,020 A | 8/1967 | Aboytes et al. ............ 106/476 |
| 3,423,391 A | 1/1969 | Kindler et al. ............ 260/41.5 |
| T860,001 I4 | 3/1969 | Gessler ............ 260/41.5 |
| 3,528,840 A | 9/1970 | Aboytes ............ 106/473 |
| 3,671,476 A | 6/1972 | Terai et al. ............ 260/23 |
| 3,686,111 A | 8/1972 | Makhlouf et al. ............ 524/530 |
| 4,014,844 A | 3/1977 | Vidal et al. ............ 106/472 |
| 4,036,807 A | 7/1977 | Atherton ............ 523/213 |
| 4,265,768 A | 5/1981 | Beasley et al. ............ 210/682 |
| 4,320,011 A | 3/1982 | Sato et al. ............ 210/694 |
| 4,366,139 A | 12/1982 | Kühner et al. ............ 423/449 |
| 4,530,961 A | 7/1985 | Nguyen et al. ............ 106/20 R |
| 4,581,429 A | 4/1986 | Solomon et al. ............ 526/220 |
| 4,597,794 A | 7/1986 | Ohta et al. ............ 106/20 C |
| 4,820,751 A | 4/1989 | Takeshita et al. ............ 523/215 |
| 4,831,011 A | 5/1989 | Oikawa et al. ............ 502/406 |
| 4,880,857 A | 11/1989 | Mori et al. ............ 523/205 |
| 5,130,363 A | 7/1992 | Scholl et al. ............ 524/392 |
| 5,159,009 A | 10/1992 | Wolff et al. ............ 106/475 |
| 5,184,148 A | 2/1993 | Suga et al. ............ 106/20 R |
| 5,190,582 A | 3/1993 | Shinozuka et al. ............ 106/20 D |
| 5,281,261 A | 1/1994 | Lin ............ 106/20 R |
| 5,282,887 A | 2/1994 | Gay et al. ............ 106/261 |
| 5,322,912 A | 6/1994 | Georges et al. ............ 526/204 |
| 5,401,313 A | 3/1995 | Supplee et al. ............ 106/20 D |
| 5,401,804 A | 3/1995 | Georges et al. ............ 525/267 |
| 5,412,047 A | 5/1995 | Georges et al. ............ 526/204 |
| 5,449,724 A | 9/1995 | Moffat et al. ............ 526/204 |
| 5,498,679 A | 3/1996 | Moffat et al. ............ 526/204 |
| 5,530,079 A | 6/1996 | Veregin et al. ............ 526/219.3 |
| 5,545,504 A | 8/1996 | Keoshkerian et al. ............ 430/137 |
| 5,554,739 A | 9/1996 | Belmont ............ 534/885 |
| 5,559,169 A | 9/1996 | Belmont et al. ............ 523/215 |
| 5,571,311 A | 11/1996 | Belmont et al. ............ 106/20 R |

(List continued on next page.)

FOREIGN PATENT DOCUMENTS

| DE | 23 55 758 | 5/1975 |
| EP | 0 475 075 A1 | 3/1992 |
| GB | 862018 | 3/1961 |
| GB | 1191872 | 5/1970 |
| GB | 2 188 311 A | 9/1987 |
| JP | 56-078629 | 6/1981 |
| JP | 59/082467 | 5/1984 |
| JP | 63-183227 | 7/1987 |
| JP | 6-250073 | 10/1987 |
| JP | 60-067421 | 3/1994 |
| WO | WO 91/02034 | 2/1991 |
| WO | WO 91/15425 | 10/1991 |
| WO | WO 92/13983 | 8/1992 |
| WO | WO 95/01838 | 1/1995 |
| WO | WO 96/18688 | 6/1996 |
| WO | WO 96/37547 | 11/1996 |
| WO | WO 97/18247 | 5/1997 |
| WO | 47698 | 12/1997 |
| WO | 99/23174 | 5/1999 |

OTHER PUBLICATIONS

Derwent Abstract, AN No. 80/03330C, "Sulphonated Carbon Pigment Production by Treating Technical Grade Carbon with Hot Aqueous Acid," SU,A, 659523, Apr. 1979.
Derwent Abstract, AN No. 82–28019E, "Penetrating Flexographic Print Ink Based Polyacrylic Resin," Oct. 17, 1979, SU,A, 834062.

(List continued on next page.)

Primary Examiner—Peter Szekely

(57) ABSTRACT

A modified particle or aggregate is disclosed wherein a particle has an attached group having the formula:

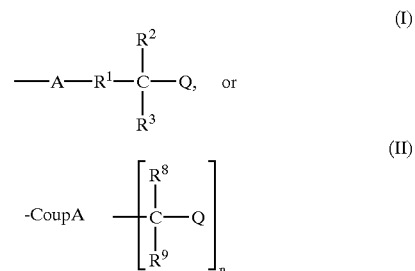

wherein the substituents are defined in the disclosure. Modified particles with attached polymers are also disclosed as well as methods of making the modified products.

24 Claims, No Drawings

U.S. PATENT DOCUMENTS

| | | | | |
|---|---|---|---|---|
| 5,575,845 | A | | 11/1996 | Belmont et al. ............ 106/712 |
| 5,610,250 | A | | 3/1997 | Veregin et al. .......... 526/219.3 |
| 5,630,868 | A | | 5/1997 | Belmont et al. ......... 106/31.75 |
| 5,654,357 | A | | 8/1997 | Menashi et al. ............ 524/495 |
| 5,672,198 | A | | 9/1997 | Belmont ...................... 106/20 |
| 5,698,016 | A | | 12/1997 | Adams et al. ............. 106/31.6 |
| 5,707,432 | A | | 1/1998 | Adams et al. ............. 106/31.6 |
| 5,713,988 | A | | 2/1998 | Belmont et al. ........... 106/31.6 |
| 5,714,993 | A | | 2/1998 | Keoshkerian et al. ......... 347/95 |
| 5,723,511 | A | | 3/1998 | Kazmaier et al. ............. 522/35 |
| 5,728,747 | A | | 3/1998 | Kaznaier et al. .............. 522/11 |
| 5,747,562 | A | | 5/1998 | Mahmud et al. ............ 523/215 |
| 6,068,688 | A | * | 5/2000 | Whitehouse et al. .... 106/31.65 |
| 6,103,380 | A | | 8/2000 | Davenport .................. 428/403 |
| 6,337,358 | B1 | * | 1/2002 | Whitehouse et al. ....... 523/200 |
| 6,350,519 | B1 | * | 2/2002 | Devonport .................. 428/403 |
| 6,368,239 | B1 | * | 4/2002 | Devonport et al. ........ 106/31.6 |
| 6,372,820 | B1 | * | 4/2002 | Devonport .................. 523/215 |
| 6,551,393 | B2 | * | 4/2003 | Devonport et al. ........ 106/31.6 |
| 6,586,501 | B1 | * | 7/2003 | Dalton et al. ............... 523/215 |

OTHER PUBLICATIONS

Derwent Abstract, AN No. 86–335147, "Wear Resistant Rubber Composition for Tire Tread Rubber," Apr. 30, 1985, JPA 61–250042, Nov. 1986.

Derwent Abstract, AN No. 93–261471, "Carbon Black for Coating Magnetic Recording Media—Having Silicon Dioxide Coating, Give Good Dispensability, Lubrication, etc.", Japanese Patent Application No. 5178604, Jul. 20, 1993.

Derwent Abstract, AN No. 93–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstract of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43 No. 4, pp 289–98, 164, no month.

Zoheidi et al., "Role of Oxygen Surface Groups in Catalysis of Hydrogasification of Carbon Black by Potassium Carbonate," Carbon, vol. 25, No. 6, pp. 809–819, 1987.

Delamar et al., J. Am. Chem. Soc. 1992, 114, 5883–5884.

Huang et al., "Surface–Confined Living Radical Polymerization for Coatings in Capillary Electrophoresis," Analytical Chemistry, vol. 70, No. 19., Oct. 1, 1998, pp. 4023–4029.

Huang et al., "Surface–Initiated Radical Polymerization on Porous Silica," Analytical Chemistry, vol. 69, No. 22, Nov. 15, 1997, pp. 4577–4580.

David Rotman, "Living Polymerization Promises Novel Materials" Chemical Week, Jun. 11, 1997. pp 41.

Derwent Abstract, Acc. No. 84–155581/25 "Surface treatment of carbon fiber acting as cathode comprises treating with electricity in water in presence of basic organic amide," JP 59082467A.

Wang et al. "Controlled/'Living' Radical Polymerization. Atom Transfer Radical Polymerization in the Presence of Transition–Metal Complexes" American Chemical Society (1995) pp. 4–5.

Goto et al., "Mechanism and Kinetics of Iodide–Mediated Polymerization of Styrene" Macromolecules 1998, vol. 31, pp. 2809–2814.

E.P. Plueddemann, "Silane Coupling Agents" (1982), Plenum Press, New York, p. 142 and p. 167–205.

Grant & Hackh's Chemical Dictionary, McGraw–Hill Book Company, Fifth Edition, p. 24 (1987).

* cited by examiner

PARTICLE HAVING AN ATTACHED HALIDE GROUP AND METHODS OF MAKING THE SAME

This application is a divisional of U.S. patent application Ser. No. 09/324,315 filed Jun. 2, 1999, now U.S. Pat. No. 6,350,519 which is a continuation-in-part of U.S. patent application Ser. No. 09/089,263 filed Jun. 3, 1998, now U.S. Pat. No. 6,103,380 which is incorporated in its entirety by reference herein.

BACKGROUND OF THE INVENTION

The present invention relates to particles, such as carbon black, having an attached halide containing radical which permits the formation of modified particles having blocked radical sources. The present invention further relates to methods of preparing and using such modified particles.

The role of carbon black as a thermal stabilizer in polymeric systems is discussed by W. L. Hawkins, R. H. Hansen, W. Matreyek, F. H. Winslow; *J. Applied Polymer Science*, vol. 1, pages 37–42, 1959; J. T. Cruver, K. W. Rollmann: *J. Applied Polymer Science*, vol. 8, pages 1169–83, 1964, and by G. Ivan, M. Giurgina: *Revue Roumaine de Chemie*, vol. 29, number 8, pages 639–646, 1984. In each discussion the mechanism is through phenolic and quinone oxygen groups on the carbon black surface behaving either as radical traps or peroxide decomposers. One skilled in the art, however, would consider these sites unavailable as initiating sites for polymerization processes.

Belmont et al. (J. A. Belmont, J. M. Funt: International Rubber Conference, Essen, Germany, Jun. 24–27, 1991) identified the presence of peroxide groups, typically in the range 0.1 to 0.4 micromoles/sq meter, on the carbon black surface. However, the majority (greater than 80%) of the peroxide groups are thermally stable to heat treatment at 200° C. and hence cannot be considered to be potential initiating sites for radical polymerization.

Tsubokawa et al. (K. Fujiki, N. Tsubokawa, Y. Sone: *Polymer J.*, vol. 22, number 8, pages 661–70, 1990, and N. Tsubokawa: *Prog. Polymer Science*, vol. 17, pages 417–70, 1992) discuss growing polymers from an activated carbon black surface by first attaching a reactive group via the oxygen groups on the carbon black surface. Typical examples include the use of glycidyl methacrylate where the glycidyl group reacts with phenolic hydroxyl groups on the carbon black surface providing a vinyl functionality; the reaction of 4,4' azo bis-(4-cyanovaleric acid) whereby the isocyanate group reacts with phenolic hydroxyl groups and subsequent heating decomposes the azo group to generate an alkyl radical; and the reaction of the phenolic hydroxyl groups with butyl lithium which can then be used as an initiation site for anionic polymerization.

All of these approaches require the presence of oxygen groups on the carbon black surface. Since the level of reactive hydroxyl and carboxylic acid groups, relative to the above approaches, present on a typical furnace or thermal carbon black is typically 0.01 to 0.1 micromoles/sq meter, the number of potential initiation sites is quite low.

Further, subsequent polymerization from these activated sites will most likely occur in the normal manner for free radical polymerization with the chains being irreversible terminated by chain combination reactions, combination with unreacted oxygen groups on the carbon black surface, and/or the addition of chain stoppers. In all cases the polymerization cannot be reinitiated. Accordingly, there is a need to provide modified particles which overcome the above-described limitations.

SUMMARY OF THE INVENTION

In accordance with the purpose of the present invention, as embodied and broadly described herein, the present invention relates to a modified particle which includes a particle having an attached group having the formula:

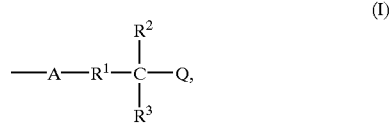
(I)

wherein A represents an aromatic group or an alkyl group; $R^1$ represents a bond, an arylene group, an alkylene group,

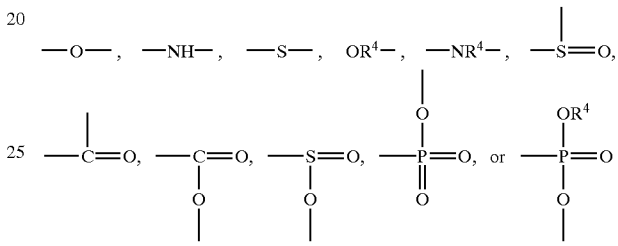

wherein $R^4$ is an alkyl or alkylene group or an aryl or arylene group; $R^2$ and $R^3$, which can be the same or different, represent hydrogen, an alkyl group, an aryl group, —$OR^5$, —$NHR^5$, —$NR^5R^5$ or —$SR^5$, wherein $R^5$, which can be the same or different, represents hydrogen, an alkyl group or an aryl group; and Q represents a labile halide containing radical.

The present invention further relates to a modified particle or aggregate wherein the particle or aggregate is a carbon-metal multiphase aggregate, a carbon-silicon containing species multiphase aggregate, a metal oxide, or a metal hydroxide. Attached to the particle or aggregate is a group having the formula:

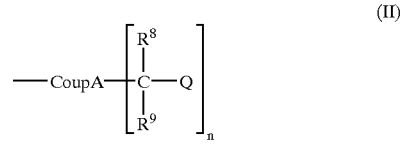
(II)

wherein CoupA represents a Si-containing group, a Ti-containing group, a Cr-containing group, or a Zr-containing group; $R^8$ and $R^9$, which can be the same or different, represent hydrogen, an alkyl group, an aryl group, —$OR^{10}$, —$NHR^{10}$, —$NR^{10}R^{10}$, or —$SR^{10}$, wherein $R^{10}$, which can be the same or different, represents hydrogen, an alkyl group or an aryl group; Q represents a labile halide containing radical, and n is an integer of from 1 to 3.

The present invention further relates to a modified particle with an attached polymer or blocked radial sources, wherein the modified particle has an attached group having the formula:

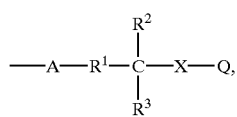

(III)

wherein X represents blocked radial sources or a polymer formed from at least one polymerizable vinyl or diene based monomer, A represents an aromatic group or an alkyl group; $R^1$ represents a bond, an arylene group, an alkylene group,

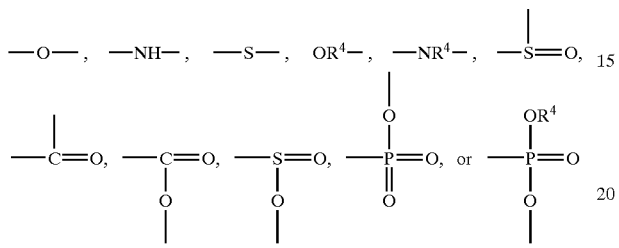

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$ or $-SR^5$, wherein $R^5$, which can be the same or different, represents an alkyl group or an aryl group; and Q represents a labile halide containing radical.

The present invention also relates to another modified particle having an attached polymer. The particle is a carbon-metal multiphase aggregate, a carbon-silicon containing species multiphase aggregate, a metal oxide, or a metal hydroxide. Attached to the particle is a group having the formula:

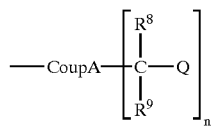

(II)

wherein CoupA represents a Si-containing group, a Ti-containing group, a Cr-containing group, or a Zr-containing group; $R^8$ and $R^9$, which can be the same or different, represent hydrogen, an alkyl group, an aryl group, $-OR^{10}$, $-NHR^{10}$, $-NR^{10}GR^{10}$, or $-SR^{10}$, wherein $R^{10}$, which can be the same or different, represents an alkyl group or an aryl group; Q represents a labile halide containing radical, X is blocked radical sources or a polymer formed from at least one polymerizable monomer, and n is an integer of from 1 to 3.

The present invention, in addition, relates to a method for preparing and using these various modified particles. In making the modified particle of formula (I), the particle can have the aromatic or alkyl group and the $-R^1-CR^2R^3$ attached in any fashion either in a single step or multiple steps. $-Q$ can then be attached using sufficient temperature and acid. In making the modified particle with the attached polymer, the method includes reacting a particle having an attached aromatic group substituted with $R'-CR^2R^3-Q$ with a transition metal halide, a complexing ligand, and a polymerizable monomer.

The present invention, in addition, relates to a method for preparing and using these various modified particles. For instance, in making the modified particle of formula (I), the particle can have the aromatic or alkyl group and the $-R^1-CR^2-R^3$ attached in any fashion either in a single step or multiple steps. $-Q$ can then be attached using an esterification technique, such as acid catalyzed esterification. In making the modified particle with the attached polymer, the method includes reacting a particle having an attached aromatic or alkyl group substituted with $R^1-CR^2R^3-Q$ with a transition metal halide, a complexing ligand, and a polymerizable monomer.

It is to be understood that both the foregoing general description and the following detailed description are exemplary and explanatory only and are intended to provide further explanation of the present invention, as claimed.

DETAILED DESCRIPTION OF THE PRESENT INVENTION

In one embodiment, the present invention relates to a modified particle comprising a particle having attached a group having the formula:

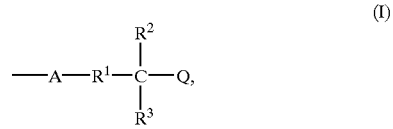

(I)

wherein A represents an aromatic group or an alkyl group which is attached to the particle; $R^1$ represents a bond, an arylene group, an alkylene group,

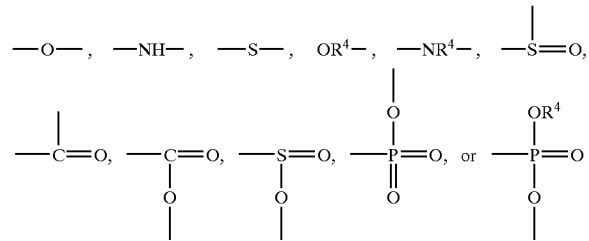

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$, or $-SR^5$, wherein $R^5$, which can be the same or different, represents an alkyl group or an aryl group; and Q represents a labile halide containing radical.

The particle, to be modified, can be any particle capable of having a group represented by any one of the formulas described herein attached thereto, such as formula (I)–(IV). Preferably, the particle has a carbon reactive site (C—), since in a preferred embodiment for the groups of formula (I) and (III), $-Q$ and $-X-Q$ are preferably attached through a carbon bond on the particle. The particle, for instance, can be carbon products, colored pigments other than carbon products, metal oxides (e.g., silica), metal hydroxides, multiphase aggregates comprising a carbon phase and a silicon-containing species phase, multi-phase aggregates comprising a carbon phase and a metal-containing species phase, and the like. The carbon may be of the crystalline and/or amorphous type. Examples of carbon products include, but are not limited to, graphite, carbon black, vitreous carbon, activated charcoal, activated carbon, carbon fiber, and mixtures thereof. Finely divided forms of the above are preferred. Most preferably, the particle is a carbon product, and most preferably carbon black.

The multi-phase aggregate containing the carbon phase and the silicon-containing species phase can also be considered a silicon-treated carbon black aggregate and the multi-phase aggregate containing a carbon phase and a metal-containing species phase can be considered to be a metal-treated carbon black aggregate as long as one realizes that in either case, the silicon-containing species and/or metal-containing species are a phase of the aggregate just like the carbon phase. The multi-phase aggregates do not represent a mixture of discrete carbon black aggregates and discrete silica or metal aggregates and is not a silica coated carbon black. Rather, the multi-phase aggregates used in the present invention include at least one silicon-containing or metal-containing region concentrated at or near the surface of the aggregate (but part of the aggregate) and/or within the aggregate.

The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase. For instance, when the multi-phase aggregate having a carbon phase and a silicon-containing species phase is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The metal-treated carbon blacks are aggregates containing at least a carbon phase and a metal-containing species phase. The metal-containing species include compounds containing aluminum, zinc, magnesium, calcium, titanium, vanadium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species phase can be distributed through at least a portion of the aggregate and is an intrinsic part of the aggregate.

Further, it is within the bounds of the present invention to have a metal-treated carbon black containing more than one type of metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the multi-phase aggregates used in the present invention can have two or more different types of metal-containing species phases and/or additional non-metal species phases.

Preferably, for purposes of the present invention, the amount of elemental silicon and/or elemental metal present in the multi-phase aggregate is from about 0.1 to about 25 wt. %, more preferably, from about 0.5 wt. % to about 10 wt. %, and most preferably from about 0.2 wt. % to about 5.4 wt. %, by weight of the aggregate.

The details of making the multi-phase aggregates are explained in U.S. Pat. Nos. 5,904,762; 5,877,238; 5,869,550; and 5,830,930; PCT Publication No. WO 96/37547, U.S. patent application Ser. No. 08/828,785, filed Mar. 27, 1997; U.S. patent application Ser. No. 08/837,493, filed Apr. 18, 1997; and U.S. patent application Ser. No. 09/061,871 filed Apr. 17, 1998. All are hereby incorporated in their entireties herein by reference.

A silica-coated carbon product can also be used as the particle, which is described in PCT Application No. WO 96/37547, published Nov. 28, 1996, and is hereby incorporated in its entirety herein by reference.

The colored pigment is any pigment which can be modified with the attachment of an aromatic group or an alkyl group. The colored pigments other than carbon products include, but are not limited to, black, white, blue, brown, cyan, green, violet, magenta, red, yellow, as well as mixtures thereof. Suitable classes of colored pigments include, but are not limited to, anthraquinones, phthalocyanine blues, phthalocyanine greens, diazos, monoazos, pyranthrones, perylenes, heterocyclic yellows, quinacridones, and (thio) indigoids. Specific examples and further information concerning the colored pigments and methods of making colored pigments with attached aromatic groups or alkyl groups are described in PCT Publication No. WO 97/47699, incorporated in its entirety by reference herein.

Particles useful for the present invention may, for example, have primary particles sizes in the general range of from about 10 nm to about 500 nm, and preferably from about 10 nm to about 250 nm, and primary aggregate sizes in the general range of from about 50 nm to about 100 microns, preferably from about 50 nm to about 10 microns, still more preferably from about 75 nm to about 1 micron. The BET surface area of these particles can be any suitable surface area and preferably ranges from about 10 $m^2/g$ to about 2000 $m^2/g$ and more preferably, from about 10 $m^2/g$ to about 1,000 $m^2/g$, and still more preferably from about 50 $m^2/g$ to about 500 $m^2/g$; and the particle structure preferably ranges from about 10 cc/100 g to about 1000 cc/g, more preferably, from about 50 cc/100 g to about 200 cc/100 g.

The number of Q groups attached to the particle prior to polymerization can be any amount. For instance, the number of —Q groups may range from about 0.01 mmole/g (of particle) to about 10 mmole/g, preferably from about 0.1 mmole/g to about 4 mmole/g, and still more preferably from about 0.5 mmole/g to about 3 mmole/g.

When the particle is a multi-phase aggregate, like a carbon phase and a silicon-containing species phase, preferably the group of formula (I) or (III) is attached at least, if not exclusively, on the carbon phase.

With regard to the aromatic group, any aromatic group may be used. Unlike the polymerizable monomer discussed later, the aromatic group is not a polymer and is not polymerized. Examples include, but are not limited to, arylene groups. Preferred arylene groups include, but are not limited to, phenylene and naphthalene groups. The aromatic group includes, but is not limited to, unsaturated cyclic hydrocarbons containing one or more rings. The aromatic group may be substituted or unsubstituted. Aromatic groups include aryl group (for example, phenyl, naphthyl, anthracenyl, and the like), and heteroaryl groups (for example, imidazolyl, pyrazolyl, pyridinyl, thienyl, thiazolyl, furyl, triazinyl, indolyl, and the like). The alkyl group is preferably a C1–C12 alkyl group, and may be branched or unbranched, and is preferably ethyl.

With respect to $R^1$, preferred arylene groups include, but are not limited to, benzene ring containing groups. Preferred alkylene groups include, but are not limited to, $C_1$–$C_{18}$ alkylene-containing groups. These groups can be linear, branched, or unsaturated. These examples of arylene and alkylene groups can also be considered examples of $R^4$. Preferred alkyl groups for $R^4$ are $C_1$–$C_{20}$ alkyl groups, more preferably $C_1$–$C_5$ alkyl groups and preferred aryl groups are phenyl, biphenyl, and naphthyl.

With respect to $R^2$ and $R^3$, which can be the same or different, examples of alkyl groups (e.g. $C_1$–$C_{20}$ alkyl group) include, but are not limited to, methyl, ethyl, propyl, butyl, and the like. Preferably, the alkyl group is a $C_1$–$C_5$ alkyl group. Examples of aryl groups include, but are not limited to, phenyl, biphenyl, and naphthyl. The alkyl and aryl groups mentioned here as well as the arylene and alkylene groups mentioned throughout can be unsubstituted or substituted for purposes of the present invention. $R^5$ can be the same type of alkyl and aryl groups mentioned above with respect to $R^2$ and $R^3$.

The labile halide containing group which is substituted or attached to the aromatic group as shown in formula (I) above, is a halide containing group wherein the labile halide (e.g., fluorine, bromine, iodine, chlorine) in the group is capable of forming an oxidized species with a transition metal halide. Preferably, the labile halide has a weak halide bond between the halide and the atom capable of forming the free radical. The labile halide is capable of undergoing chemical reaction resulting in the formation of the radical group which previously contained the labile halide. The group containing the labile halide in turn forms a radical which comprises a carbon atom, oxygen atom, nitrogen atom, sulfur atom, phosphorus atom, boron atom, and/or silicon atom. Other organic species or groups can be a part of the group containing the labile halide such as alkyl, aryl, and the like. Specific examples of the labile halide containing group include, but are not limited to, aryl halides, aryl alkyl halides, alkyl halides, benzyl halides, arenesufonyl halides, phosphorous halides, haloalkyl esters, sulfur halides, silicon halides, arenecarbonyl halides, and other labile halide containing groups. A more specific example of a labile halide containing group a bromo- or chloro-alkyl, such as bromoethyl, bromomethyl, bromo propyl and bromododecyl as well as the chloro versions of these groups which can form radicals.

Another embodiment of the present invention relates to a modified particle or aggregate having a group of formula (II) attached thereto. The particle can be a metal oxide, a metal hydroxide, an aggregate comprising at least one carbon phase and a metal-containing species phase, or an aggregate comprising at least one carbon phase and at least one silicon-containing species phase. Attached to this particle or aggregate is a group having the formula:

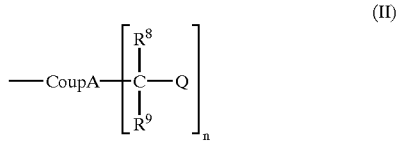

(II)

wherein CoupA represents a Si-containing group, a Ti-containing group, a Cr-containing group, or a Zr-containing group; $R^8$ and $R^9$, which can be the same or different, represent hydrogen, an alkyl group, an aryl group, —$OR^{10}$, —$NHR^{10}$, —$NR^{10}R^{10}$, or —$SR^{10}$, wherein $R^{10}$ represents an alkyl group or an aryl group; Q represents a labile halide containing radical, and where n is an integer of from 1 to 3. Preferably, CoupA is attached to the particle or aggregate, especially in the case of a Si-containing group, via an oxygen radical which can form a part of a CoupA.

Examples of Si-containing groups include, but are not limited to, dimethylsilylmethyl, dialkoxysilylmethyl, and the like. Examples of Ti-containing groups include, but are not limited to, alpha substituted tri-acetyl titanate and the like. Examples of Zr-containing groups include, but are not limited to, dialpha methoxy neopentylzirconate, aluminum zirconates and the like.

Examples of the substituents $R^8$ and $R^9$ can be the same as the substituents $R^2$ and $R^3$ mentioned above. Likewise, examples of the substituent $R^{10}$ can be the same as the substituent $R^5$ discussed above. Also, the Q is the same as discussed above.

The modified particles having the attached group of the formulas, such as formula (I), can be made in the following manner. A particle, such as carbon black, can first have a substituted or non-substituted aromatic or alkyl group attached to the particle, wherein the aromatic or alkyl group is directly attached to the particle. This attachment can be accomplished by the methods described in PCT International Application No. WO 96/18688 and U.S. Pat. Nos. 5,851,280; 5,630,868; 5,559,169; 5,571,311; and 5,559,169 as well as U.S. patent application Ser. No. 08/572,525, all of which are hereby incorporated in their entireties by reference herein.

The particle having the attached aromatic or alkyl group can then react with —$R^1$—$CR^2R^3$ and then a labile halide containing radical source for a sufficient time and at a sufficient temperature to form the modified particle having the attached group, like that of formula I. The labile halide containing radical source is present in amounts sufficient to react with —A—$R^1$—$CR^2R^3$ present on the particle. Preferably, the amount of the labile halide containing radical source is from about 0.01 mmoles/g (of particle) to about 10 mmoles/g and more preferably from about 0.01 to about 5 mmoles/g. Alternatively, the labile halogenating containing species can be formed by halogenation of a C—O bond with a halogenating agent such as phosphorous tri-bromide.

Alternatively, the modified particles of the present invention can be made by first forming the groups of the formulas described above, such as formula (I). Preferably, the labile halide containing radical group is attached in the meta or para position of the aromatic group, if present. This group is then attached to the particle by a diazonium treatment in the manner described in the above referenced patents and patent applications, where a diazonium salt will first be formed containing a group of one of the formulas described above in the manner described in the above-referenced patents. The groups of the formulas can be then subsequently attached to the particle. In a less preferred way, the formulas of the present invention can be attached to the particle through a hydroxyl or carbonyl group present on the particle.

Also, the modified particle of the present invention can be formed by attaching a labile halide containing group containing at least one alkoxy silyl, alkoxy titanyl, or alkoxy zirconyl group to the particle which, in this particular process is preferably a metal oxide or metal hydroxide, or a carbon surface. This particular embodiment would attach a group of formula (II) or (IV) to a particle.

In another process, the modified particle can be formed by first taking an aromatic or alkyl group and reacting it with $R^1CR^2R^3$ containing compound to form the groups of the formulas described above except for the presence of the —Q group. In other words, a group having the formula A—$R^1$—$CR^2R^3$ would first be formed and then the —Q group would be attached to this group to form a group of formula (I) of the present invention which can then be attached to the particle. In this process, $R^2$ and $R^3$ are preferably hydrogen.

Alternatively, the process of making the modified particles of the present invention can be a three step process where A is first attached to the particle and then the group having the formula $R^1$—C—$R^2R^3$ can be attached to the aromatic or alkyl group. Then in a third step, the —Q can be attached to the $R^1$—C—$R^2R^3$ group.

The modified particles of formula (II) can be made in the following manner. The aggregate comprising at least one carbon phase and at least one metal-containing species phase can be made as described in U.S. patent application Ser. No. 08/828,725, hereby incorporated herein by reference. The aggregate comprising at least one carbon phase and at least one metal containing species phase can be made as described in U.S. Pat. Nos. 5,904,762 and 5,877,238. The aggregate or particle can then be reacted with a coupling agent by adding the coupling agent to the aggregate in a medium and mixing. Then, the aggregate or particle having the attached coupling group can be reacted with a labile halide containing radical source as described above.

For purposes of the above-described reactions, the reaction should occur for a time and temperature sufficient to form the attached group onto the particle or aggregate. Generally, this time is from about 3 minutes to about 96 hours and more preferably from about 1 hour to about 24 hours.

With the modified particles described above, polymers can be attached onto these attached groups by reacting these modified particles or aggregates with a polymerizable monomer such as a vinyl or diene containing monomer. Specific examples of such monomers include, but are not limited to, styene, isoprene, butadiene, chloromethylstyrene, methyl methacrylate, and butyl methacrylate, as well as acrylic acid and esters of acrylic acid and methacrylic acid and esters of methacrylic acid. More specific monomer examples include, but are not limited to, hydroxyalkyl (meth)acrylates, such as hydroxyethyl (meth)acrylate, hydroxyproyl (meth)acrylate; alkyl (meth)acrylates such as methyl acrylate or butyl acrylate; glycidyl (meth)acrylate; dimethylaminoethylacrylate; 2-acryl trimethyl ethylammonium chloride; aminoethyl acerylate; acrylonitirle; vinyl acetate, and the like. Mixtures of two or more monomers can be also used or polymerized sequentially. If polymeric gels are described, then the monomer or portion thereof is preferably a halide containing vinyl monomer or diene containing monomer (e.g., chloromethyl styrene or vinyl chloride).

The polymerization reaction is conducted under conditions which permits the polymerization of the monomer so that it forms a part of the attached group onto the particle or aggregate. These conditions include ambient temperatures and can include preferably heating modified particles with a monomer above 80° C., preferably from about 120° C. to about 150° C., in the presence of a solvent, a transition metal halide, and a complexing ligand. The reaction can be ended by lowering the temperature. The sequence of addition is not important and the particle (for instance Formula (I) or (III) complexing ligand, and transition metal halide can be added in any order. A preformed transition metal halide complex can alternatively be used in lieu of the separate components. In addition, complexing ligand and transition metal halide can first be reacted to form a complex or the reaction can occur in situ. The polymer-modified particle can then be subjected to distillation, steam stripping, or precipitation or other known methods in order to remove residual monomers and solvents. Examples of transition metal halides include, but are not limited to, copper (I) halides, and transition metal halides wherein the metal is copper, rhodium, iron, nickel, cobalt, palladium, and ruthenium. A specific and preferred example of the transition metal halide is copper (I) chloride. The complexing ligand can be any compound capable of complexing with the transition metal halide in order to be an efficient halide atom transfer promoter. Examples of the complexing ligand include, but are not limited to, 2,2'-bipyridine and derivatives thereof (e.g., alkyl substituted bipyridines), derivatives of triphenyl phosphines, and multidentate amines were the nitrogen atoms are preferably separated by ethylene or propylene units.

The polymerization reaction thus can produce any length of polymer on the modified particle or aggregate. For example, polymers having average molecular weights, preferably ranging from about 500 to about 1,000,000 can be made. Other ranges of average molecular weights include, but are not limited to, from about 500 to about 3,000, and from about 500 to about 2,000, and from about 500 to about 500,000, and from about 1,000 to about 250,000. The polymers can be any type, such as homopolymers, co-polymers, ter-polymers, or higher chain polymers. The polymers can also be block, graft, or random-type polymers. The polymers can be branched or unbranched. Polymers, such as comb polymers, can be formed or located off of the main polymer chain, and these polymers can be any type of polymer. Specific examples include, but are not limited to, polyamines, such as polyethyleneimine or polyalkylene oxides, grafted onto the main polymer chain. The polymers that are formed can be ionic (e.g., cationic or anionic) or non-ionic polymers. Specific examples of polymers include, but are not limited to, polyamides, polyacrylics, polyvinylacetates, polyvinylalcohols, polyvinylpyridines, polyvinylpyrrilodones, polyvinylimidazoles, and acrylamides and derivatives thereof as well as combinations thereof.

Once the polymerization occurs, the modified particle will have a group attached having the formula:

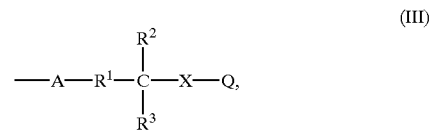

(III)

wherein the substituents are the same as described earlier for formula (I) and X is a polymer formed from at least one polymerizable monomer.

Similarly, when the modified particle or aggregate having a group of formula (II) is polymerized by the introduction of one or more monomers, the group attached to the particle or aggregate will have the formula:

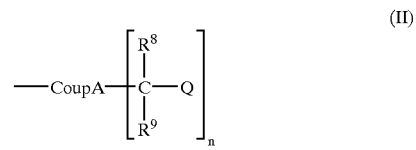

(II)

wherein the substituents are the same as described in formula (II) and X is a polymer formed from at least one polymerizable monomer.

Within the above-described groups containing the labile halide group, the modified particle or aggregate containing the labile halide group can be terminated by means known to those skilled in the art in view of the present application. In particular, the halide group can be replaced with a proton, subjected to disproportionation, or replaced with a chemical group through group transfer and the like. For instance, the halide group can be replaced with a hydroxy group. This termination or removing the halide group and replacing it or terminating it with another group can be accomplished, for instance, by methods described at Advanced Organic Chemistry, J. March, Wiley, 4$^{th}$ Ed., (1992), for instance at page 370, which is incorporated in their entirety by reference herein.

The modified particles of the present invention can form part of a polymeric composition and be present with other ingredients commonly used and found in polymeric compositions.

A particle, as described herein, can also be modified as described herein and can also be modified as described in U.S. patent application Ser. Nos. 08/962,244 and 08/968,299, and the Application entitled "Methods of Making a Particle Having an Attached Stable Free Radical" filed Jun. 3, 1998, all of which are incorporated in their entirety herein by reference. In more detail, a particle can be dual or multi-modified to have a group of formulae (I)–(IV)) attached thereto and also have a group having a labile halide containing radical attached as well, such as a group having the formulae (I)–(IV) as described in the above-referenced applications. The polymerization of the monomers on the multiple groups attached onto the particle can be accomplished in any sequence or simultaneously.

The modified particle of the present invention can be used in a variety of applications. For instance, it can be used in coating formulations or compositions, or ink formulations or compositions, or toner formulations or compositions, such as printing inks and ink jet inks, toners, automobile coatings, and the like. Also, the modified particles can be used as reinforces for compositions, such as polymeric compositions and can also serve as impact modifiers, or as agents used to increase compatibility of a polymeric composition.

In more detail, reinforcement of elastomeric compositions include tire, hose, profile extrusion, seals, gaskets, and vibration isolation units, as well as the specific reinforcement of a single elastomer phase in a multiphase elastomer blend composition; reinforcement of thermoplastic compositions such as polyolefines, styrenic, acrylics, polyesters, and polyamides, and thermoplastic elastomers and thermoplastic polyolefines; reinforcement of thermoset compositions, elg., acrylics; impact modification of thermoplastic compositions, coatings, thermoplastic elastomers, and crosslinked compositions; as a synthetic support for solid phase organic synthesis; as a support or medium for effluent extraction processes—both organic and inorganic components; as a catalyst support; and/or as a superadsorbant for either aqueous of hydrocarbon materials e.g., use in sanitary wear, growing medium for plants.

The modified particles of the present invention can be incorporated in and form a part of elastomeric compositions. Other conventional ingredients for elastomeric compositions can also be present, such as coupling agents and the like.

Coupling agents, as used herein, include, but are not limited to, compounds that are capable of coupling fillers such as carbon black or silica to an elastomer having one functionality which will attach to the particle and another functionality which will attach to the elastomer. Coupling agents useful for coupling silica or carbon black to an elastomer, are expected to be useful with the silicon-treated carbon blacks. Useful coupling agents include, but are not limited to, silane coupling agents such as bis(3) triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatiodi(3-mercapto) propionato-O (NZ 66A, from Kenrich Petrochemicals, Inc., of Bayonne, N.J.); titianate coupling agents; nitro coupling agents such as N,N'-bis(2-methyl-2-nitropropyl)-1,6-diaminohexane (Sumifine 1162, from Sumitomo Chemical Co., Japan); polyalkoxysiloxane (e.g., Zeruma from the Yokahama Rubber Co. Ltd., Japan) and mixtures of any of the foregoing. The coupling agents can be provided as a mixture with a suitable carrier, for example X50-S which is a mixture of Si-69 and N330 carbon black, available from Degussa AG.

The elastomeric compounds of the present invention may be prepared from the modified particles of the present invention by compounding with any elastomer including those useful for compounding a carbon black.

Any suitable elastomer may be compounded with the modified particles to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene. Preferably, the elastomer has a glass transition temperature (Tg) as measured by differential scanning colorimeter (DSC) ranging from about −120° C. to about 0° C. Examples include, but are not limited to, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives, such as chlorinated rubber and epoxidized rubber. The modified particles of the present invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chloromethylstyrene, acrylonitrile, 2-vinyl-pyridine, 5-methyl 2-vinylpryidine, 5-ethyl-2-vinylpyridine, 2-methyl-5-vinylpyridine, alkyl-substituted acrylates or methacrylates, vinyl ketone, methyl isopropenyl ketone, methyl vinyl ether, alpha-methylene carboxylic acids and the esters and amides thereof such as acrylic acid, methacrylic acid, and dialkylacrylic acid amide; also suitable for use herein are copolymers of ethylene and other high alpha olefins such as propylene, butane, pentane, hexane, and octane. Other monomers that could be used include norborene and hex-1,5-diene, and the like.

The rubber compositions of the present invention can therefore contain one or more elastomers, curing agents, reinforcing fillers, coupling agents, and, optionally, various processing aids, oil extenders, and anti-degradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3-butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

Elastomeric compositions disclosed in the present invention include, but are not limited to, vulcanized compositions (VR), thermoplastic vulcanizates (TPV), thermoplastic elastomers (TPE), and thermoplastic polyolefins (TPO). TPV, TPE, and TPO materials are further classified by their ability to be extruded and molded several times without loss of performance characteristics.

The elastomeric compositions may include one or more curing agents such as, for example, sulfur, sulfur donors, activators, accelerators, peroxides, and other system used to effect vulcanization of the elastomer composition.

The resultant elastomeric compounds containing the aggregates of the present invention and optionally containing one or more coupling agents may be used for various elastomeric products such as a tread compound, undertread compound, sidewall compound, wire skim compound, inner liner compound, bead, apex, any compound used in carcass and other components for vehicle tires, industrial rubber products, seals, timing belts, power transmission belting, and other rubber goods.

In an embodiment of the present invention, the elastomeric compositions of the present invention, which contain at least one modified particle of the present invention, can have a total residue after nitrogen pyrolysis at 650° C. of from about 1% to about 60% by weight.

For purposes of the present invention, the ink includes at least one type of polymerized-terminated modified particle, and at least one ink vehicle. The inkjet ink formulation includes at least one type of polymerized terminated modified particle, and at least one inkjet ink vehicle. Generally, the formulations described in WO 97/47699 with respect to coatings and inks can be used herein, however, incorporating the modified particles of the present invention. The coating formulations contain at least one type of polymerized-terminated modified particle and at least one suitable solvent. Other conventional additives may be incorporated into the coating formulations, such as a binder.

Each of these formulations can contain additional conventional colorant and other optional, conventional ingredients or additives, for instance, ad described in U.S. Pat. Nos. 5,571,311; 5,672,198; 5,266,361; 5,707,432 such as a humectant, binders, dyes, biocides, surfactants, penetrants. All of these patents are incorporated herein in their entirety by reference herein.

The toner can contain at least one polymerized-terminated modified particle and resin particles.

The conventional and standard ingredients or additives for toner formulations, such as those described in U.S. Pat. Nos. 5,278,018; 5,275,900; 5,695,899, and 5,116,712, can be used in the present invention, and are incorporated in their entirety by reference herein. The toner can be a positively or negatively charged toner composition.

In the various products incorporating the modified particles of the present invention, one or more types of other particles can also be present, such as a carbon product (e.g., carbon black), metal oxide (e.g., silica, zinc oxide, and aluminum oxide), metal silicate (e.g., clay, aluminum, calcium, magnesium silicates), modified silica, modified carbon products having an attached organic group, an aggregate comprising at least one carbon phase and at least one silicon-containing species phase optionally having an attached organic group, carbon black at least partially coated with silica, or any combination thereof. In any product mentioned herein, more than one type of modified particle of the present invention can be present in the various products described above.

The present invention will be further clarified by the following examples, which are intended to be purely exemplary of the invention.

EXAMPLES

Example 1

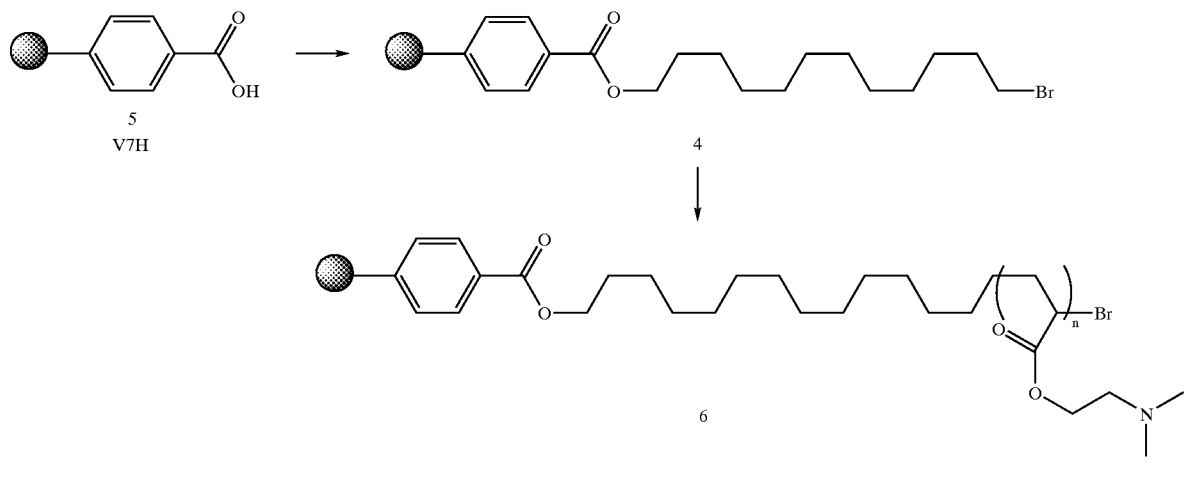

Bromo Modified Carbon Black 4

To a solution of benzoic acid Vulcan® 7H modified carbon black 5 (50 g, 0.02 mol) in toluene (250 mL) was added bromodocecanol (10.6 g, 0.04 mol) and p-toluene sulfonic acid (3.8 g, 0.02 mol). The mixture was heated at reflux under nitrogen for 18 h in the presence of a Dean & Stark trap. The mixture was filtered and washed with toluene (3×100 mL) and dried in a vacuum oven at 70° C. for 12 h.

Poly(acrylate) Modified Carbon Black 6

To a solution of the modified carbon black (5 g, 0.002 mol) in toluene (25 mL) was added copper (I) chloride (0.05 g), 2,2'-bipyridyl (0.16 g) and (2-dimethylamino)ethyl methacrylate (4 mL). The mixture was heated at 130° C. for 72 h under nitrogen, then filtered and washed with methanol. The residue was further extracted with hot methanol in a soxhlet extractor for 72 h, followed by soxhlet extraction with toluene for 72 h.

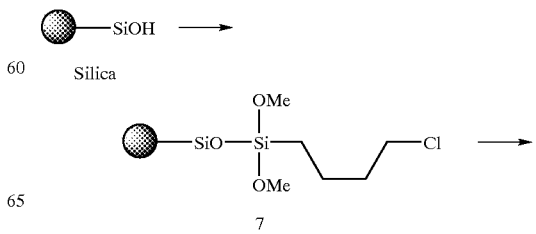

-continued

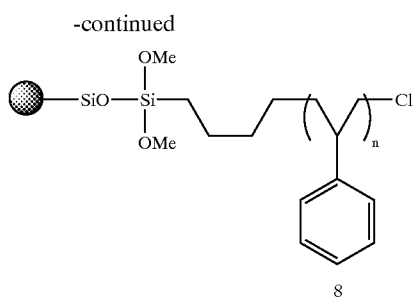

8

Silane Modified Silica 7

Silica (100 g) was suspended in a 10:1 acetone water mixture and adjusted to pH 8 with sodium hydroxide. Chloropropyltrimethoxsilane (7.9 g, 0.04 mol) was added and the solution heated at 50° C. under nitrogen for 4 h. The mixture was filtered and washed with water (4×200 mL) and acetone (4×200 mL).

Styrene Modified Silica 8

To a solution of silica (5 g, 3.75 mmol) in toluene (25 mL) was added copper (I) chloride (20 mg, 0.19 mmol), 2,2'-bipyridyl (60 mg, 0.38 mmol) and styrene (8.6 mL, 75 mmol). The mixture was heated at 130° C. for 72 h under nitrogen and filtered. The residue was washed with methanol (3×200 mL) and soxhlet extracted with toluene for 72 h.

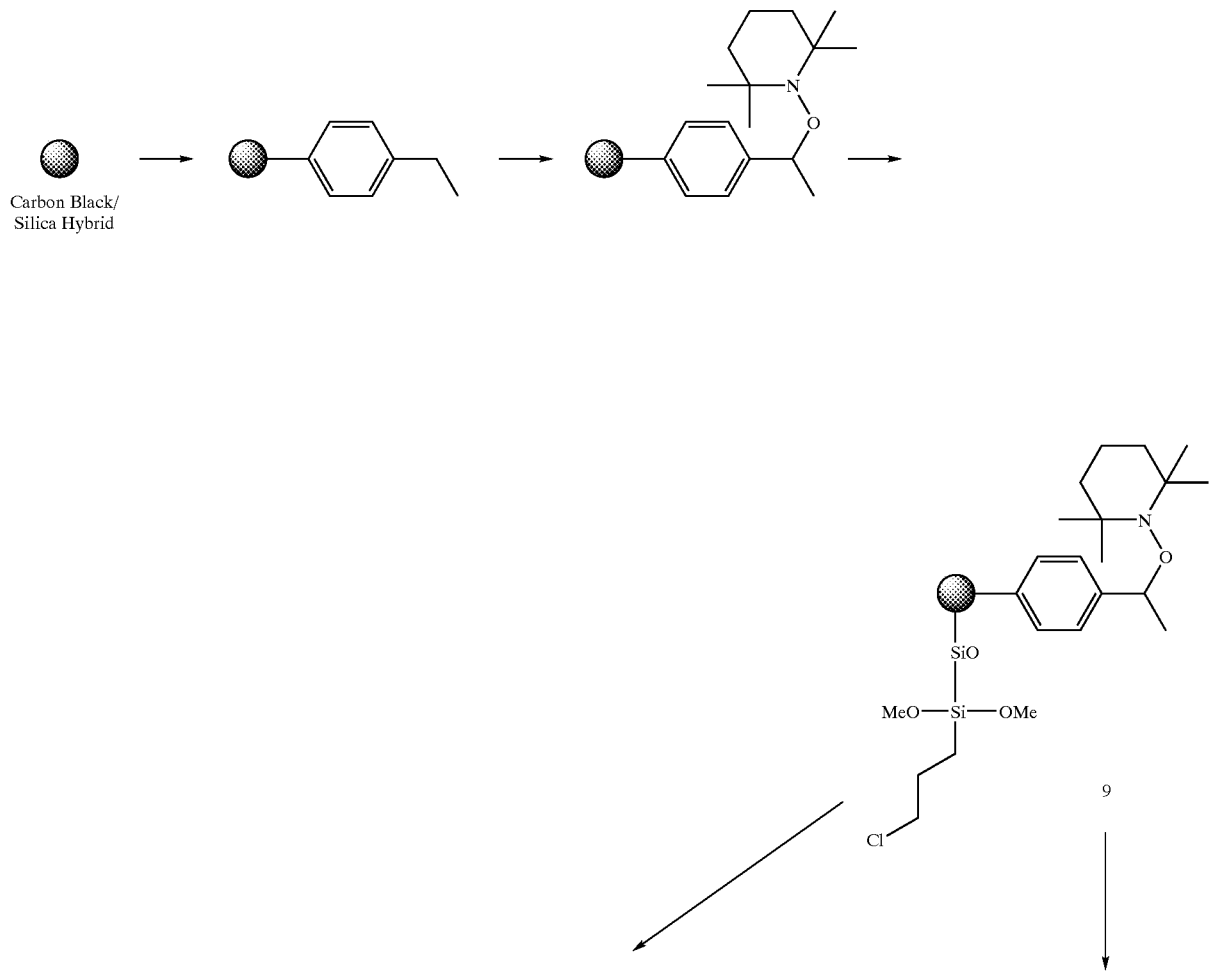

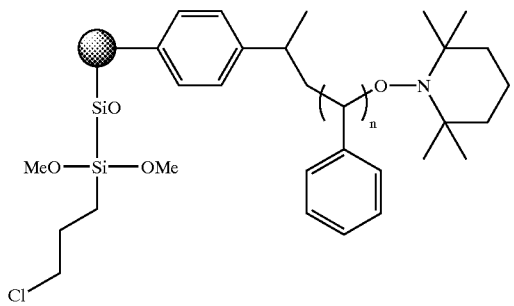

11

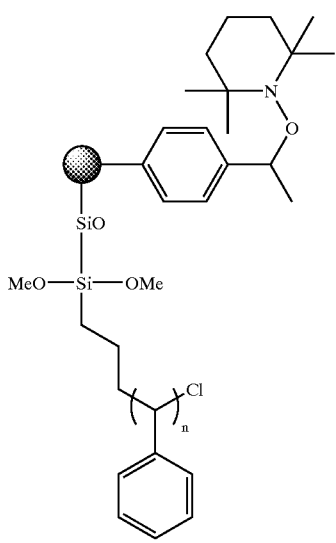

10

Styrene Modified Silicon-treated Carbon Black (Silica Phase) 10

A solution of the halogenated TEMPO adduct 9 of silicon-treated carbon black (5 g, 1.25 mmol) in styrene (20 mL) was added copper (I) chloride (60 mg, 0.6 mmol) and 2,2'-bipyridyl (200 mg, 1.27 mmol). The solution was heated at 90° C. for 72 h under nitrogen, dissolved in methylene chloride, precipitated into methanol and vacuum oven dried overnight.

Styrene Modified (Carbon Phase) 11

A solution of the halogenated TEMPO adduct 9 of silicon-treated carbon black (5 g, 1.25 mmol) in styrene (20 mL), was heated at 130° C. for 72 h under nitrogen, dissolved in methylene chloride, precipitated into methanol and vacuum oven dried overnight.

Hybrid TEMPO/Silane Modified Carbon Black 9

The carbon phase of dual phase silica/carbon black particles were modified with a TEMPO moiety by the method detailed in U.S. patent application Ser. No. 08/968,299, incorporated herein by reference. These particles (25 g) were suspended in a acetone/water (10:1, 150 mL) solution and the pH adjusted to 8.0 with potassium hydroxide. Chloropropyl trimethoxysilane (4 mL, excess) was then added dropwise and the solution and heated at 50° C. for 4 hours under nitrogen. Upon cooling the suspension was filtered and washed with acetone (3×100 mL) and water (3×100 mL) and dried overnight in a vacuum oven at 40° C.

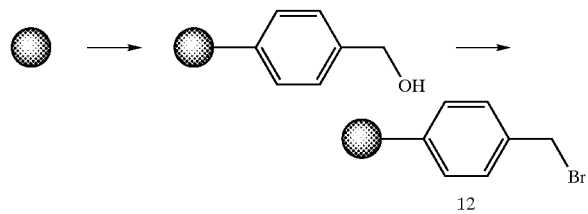

12

Bromine Modified Carbon Black 12

To a chilled (0° C.) solution of benzyl alcohol Vulcan 7H® modified carbon black (5 g, 2 mmol) in dry hexane (50 mL) was dropwise added phosphorus tribromide (0.4 mL, 4 mmol). The solution was stirred for 5 minutes, before the removal of the ice bath and stirring for a further 30 minutes. Methanol (0.5 mL) was added slowly, followed by slow addition of sodium hydrogencarbonate (satd. aq., 2 mL) and brine (satd. aq., 2 mL). The suspension was filtered and washed with water (3×100 mL), methanol (3×100 mL), and acetone (3×100 mL) before the resulting solid was dried overnight in a vacuum oven at 40° C.

Example 2

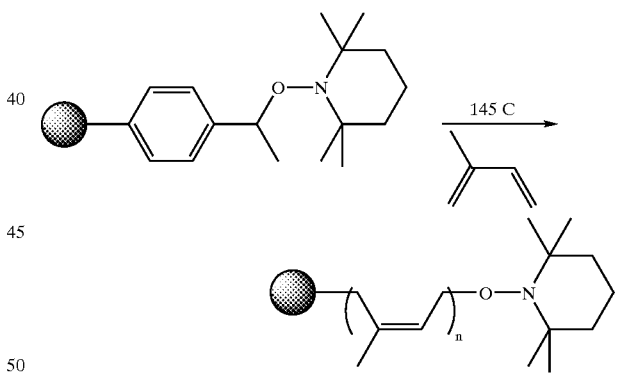

Example:

Isoprene (300 mL) was added to TEMPO modified V7H (20 g, 0.35 mmol/g) in a Parr pressure reactor. The reactor was sealed, degassed, and pressurized with Argon. The mixture was heated to 145° C. for 18 h. The resulting black suspension was precipitated into rapidly agitating methanol and isolated by filtration. The black solid was dried at 70° C.

Analysis:
48.32 wt % Isoprene (TGA)
$T_g$ (onset)=−59.25° C.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A modified particle comprising a particle having attached a group having the formula:

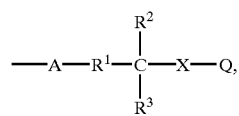 (III)

wherein A represents at least one aromatic group or at least one alkyl group; R¹ represents a bond, an arylene group, an alkylene group,

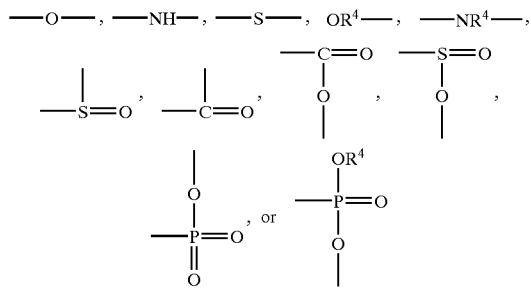

wherein R⁴ is an alkyl or alkylene group or an aryl or arylene group; R² and R³, which can be the same or different, represent hydrogen, an alkyl group, an aryl group, —OR⁵, —NHR⁵, —NR⁵R⁵, or —SR⁵, wherein R⁵, which is the same or different, represents an alkyl group or an aryl group; Q represents a labile halide containing species and X represents a polymer formed from at least one polymerizable monomer.

2. The modified particle of claim 1, wherein said polymerizable monomer is a vinyl or diene containing monomer.

3. The modified particle of claim 1, wherein said particle is a carbon product, a colored pigment other than a carbon product, a metal oxide, a metal hydroxide, or mixtures thereof.

4. The modified particle of claim 1, wherein said particle is graphite, carbon black, vitreous carbon, activated charcoal, carbon fiber, activated carbon, or mixtures thereof.

5. The modified particle of claim 1, wherein said particle is an aggregate comprising at least one silicon-containing species phase and at least one carbon phase.

6. The modified particle of claim 1, wherein said particle is an aggregate comprising a metal-containing species phase and a carbon phase.

7. The modified particle of claim 1, wherein said particle is carbon black.

8. The modified particle of claim 1, wherein said Q comprises a labile halide and a carbon atom, a nitrogen atom, a sulfur atom, a phosphorous atom, a boron atom or a silicon atom.

9. A modified particle or aggregate comprising a) an aggregate comprising at least one carbon phase and at least one metal-containing species phase, an aggregate comprising at least one carbon phase and at least one silicon-containing species phase, a metal oxide, or a metal hydroxide and b) attached to said particle or aggregate a group having the formula:

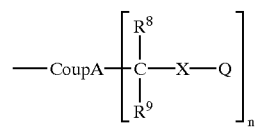 (II)

wherein CoupA represents a Si-based group, a Ti-based group, a Cr-based group, or a Zr-based group; R⁸ and R⁹, which can be the same or different, represent hydrogen, an alkyl group, an aryl group, —OR¹⁰, —NHR¹⁰, —NR¹⁰R¹⁰, or —SR¹⁰, wherein R¹⁰, which is the same or different, represents an alkyl group or an aryl group; Q represents a labile halide containing radical; X represents a polymer formed from at least one polymerizable monomer; and n is an integer of from 1 to 3.

10. The modified particle or aggregate of claim 9, wherein said metal-containing species phase comprises an aluminum containing species phase, a zinc containing species phase, a magnesium-containing species phase, a calcium-containing species phase, a titanium-containing species phase, a vanadium-containing species phase, a cobalt-containing species phase, a nickel-containing species phase, a zirconium-containing species phase, a tin-containing species phase, an antimony-containing species phase, a chromium-containing species phase, a neodymium-containing species phase, a lead-containing species phase, a tellurium-containing species phase, a barium-containing species phase, a cesium-containing species phase, an iron-containing species phase, a molybdenum-containing species phase, or mixtures thereof.

11. The modified particle or aggregate of claim 9, wherein said metal-containing species phase comprises an aluminum-containing species phase.

12. The modified particle or aggregate of claim 9, wherein said metal-containing species phase comprises a zinc-containing species phase.

13. The modified particle or aggregate of claim 9, wherein said particle or aggregate is an aggregate comprising at least one carbon phase and at least one metal-containing species phase or an aggregate comprising at least one carbon phase and at least one silicon-containing species phase.

14. The modified carbon-metal aggregate of claim 9, wherein said Q comprises a labile halide and a carbon atom, a nitrogen atom, a sulfur atom, a phosphorous atom, a boron atom or a silicon atom.

15. The modified carbon-metal aggregate of claim 9, wherein said polymerizable monomer is a vinyl or diene containing monomer.

16. A method of preparing the modified particle of claim 1, comprising reacting a modified particle with a) a polymerizable monomer, and b) a transition metal halide, and a complexing ligand or a preformed transition metal halide complex, wherein said modified particle comprises a particle having attached a group having the formula:

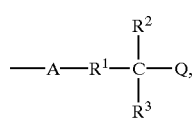 (I)

wherein A represents at least one aromatic group or at least one alkyl group; R¹ represents a bond, an arylene group, an alkylene group,

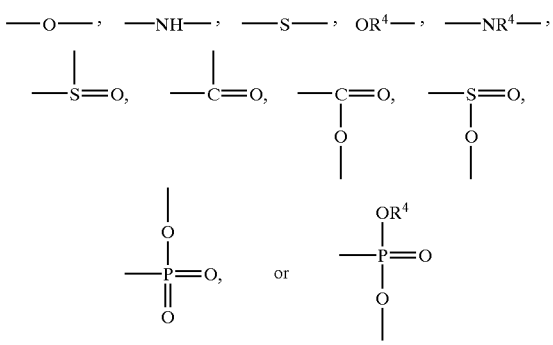

wherein R⁴ is an alkyl or alkylene group or an aryl or arylene group; R² and R³, which can be the same or different, represent hydrogen, an alkyl group, an aryl group, —OR⁵, —NHR⁵, —NR⁵R⁵, or —SR⁵, wherein R⁵, which is the same or different, represents an alkyl group or an aryl group; and Q represents a labile halide containing species.

17. The method of claim 16, wherein the transition metal in the transition metal is copper, rhodium, iron, nickel, cobalt, palladium, or ruthenium.

18. The method of claim 16, wherein said transition metal halide is copper (I) halide.

19. The method of claim 16, wherein said complexing ligand is 2,2'-bipyridine.

20. The method of claim 16, wherein said polymerizable monomer comprises styrenic, acrylic esters, methacrylic esters, or combinations thereof.

21. A coating or ink composition comprising an aqueous or non-aqueous solvent, and the modified particle of claim 1.

22. A coating or ink composition comprising an aqueous or non-aqueous solvent, and the modified particle of claim 9.

23. The composition of claim 21, wherein said composition is an ink.

24. The ink composition of claim 23, when said ink is an inkjet ink.

* * * * *